United States Patent Office.

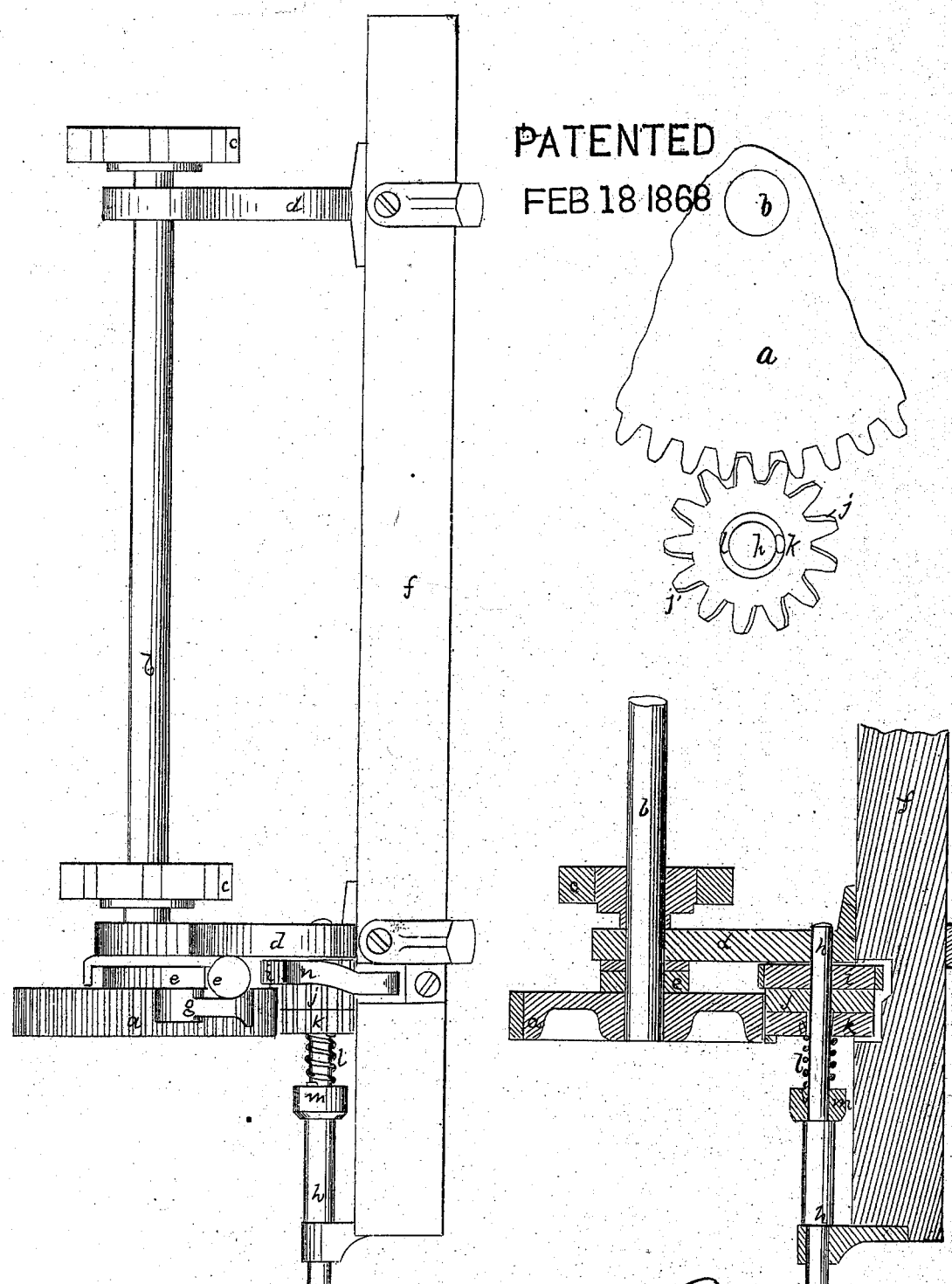

ASA M. BEARD, OF HILLSBORO, NEW HAMPSHIRE.

Letters Patent No. 74,488, dated February 18, 1868.

IMPROVEMENT IN GEARING.

The Schedule referred to in these Letters Patent and making part of the same.

TO ALL WHOM IT MAY CONCERN:

Be it known that I, ASA M. BEARD, of Hillsboro, in the county of Hillsboro, and State of New Hampshire, have invented an Improvement in Gearing; and I do hereby declare that the following, taken in connection with the drawings which accompany and form part of this specification, is a description of my invention sufficient to enable those skilled in the art to practise it.

This invention is designed for the prevention of play or unnecessary movement between the teeth of gears which are meshed into each other, or, in other words, according to technical usage, is designed to prevent back-lash between two meshed gears.

Gears are rarely fitted so that one of a meshed pair cannot be moved without imparting movement to the other; and even if so fitted, the abrasion of the teeth consequent upon wear soon allows play or back-lash between the teeth.

Back-lash ordinarily does not interfere with the movements designed to be produced by a train of gearing, because each pair of gears most commonly operates but one way, with but one face of each tooth of one subject to wear by one face of each tooth of the other gear; but where a reverse strain is brought upon one gear of a pair, then said gear is at liberty to move backward the amount permitted by the spaces left between the meshed teeth of the pair.

It is where such reversed strains are liable to be brought upon meshed gears that my invention becomes of value; and I have illustrated my invention by its application to the head-block or gauge-rest of a saw-mill, where it is desirable to have the movement or set of the head-block or gauge free from yield which would be consequent upon back-lash in the gearing by which such head-block or gauge is operated.

My invention consists in making one of a pair of meshing-gears in two parts, the division between the parts being about midway of the length of the teeth, and in a plane at right angles to the axis of rotation, when one of said parts is keyed to its shaft, and the other part is loose upon said shaft, and is connected therewith only by means of a spring arranged to act by torsion, to cause a movement of the parts of the divided gear with respect to each other, so as to cause parts of the opposite faces of each divided tooth to bear against the opposite faces of any two adjacent teeth of the whole gear between which the divided tooth may happen to be, and thus prevent movement of the whole or wide gear exept such as operates to turn the shaft of the double or divided gear.

Figure 1 shows a plan of a saw-mill gauge-bar or head-block embodying my improvement in gearing.

Figure 2 is a partial horizontal section of the same; and

Figure 3 is a partial end view thereof on an enlarged scale.

In the drawings, the whole or wide gear $a$ is shown as fixed on the shaft $b$, on which are two pinions, $c$, designed to mesh into two racks on a saw-bench frame, so that by rotation of said pinions $c$, the gauge-bar $f$ may be moved toward and from the saw, the shaft $b$ being mounted in bearings $d$ fixed to the bar $f$. To rotate the shaft $b$, so as to cause forward movement of bar $f$ toward the saw, the lever $e$ is pivoted on shaft $b$, and bears a pawl, $g$, which operates on the teeth of $a$, as on ratchet-teeth, to turn said gear, consequent upon vibrations of lever $e$. To retain the gauge-bar in place against the pressure and action of the saw, by keeping the gear $a$ from rotative movement, except such as is imparted to it by lever $e$, there is provided a shaft, $h$, mounted in bearings connected to the gauge-bar $f$. On said shaft is keyed fast a ratchet, $i$, and one half, $j$, of a divided gear, the other half, $k$, being loose on the shaft $h$, though connected therewith by means of a helical spring, $l$, one end of said spring being fixed in the half gear $k$, and the other end being fixed in the collar $m$ made fast to the shaft $h$. This spring is so applied that it has a torsional effect on half gear $k$, of sufficient power to turn the shaft $h$, the result of this being to keep one face of a tooth of $k$ against one face of a tooth of $a$, at the same time that the opposite face of the fellow-tooth of $j$ is kept in contact with the opposite face of the next tooth of $a$, between which and that tooth of $a$, just before referred to, the teeth of $j$ and $k$, just mentioned, are meshed.

It will be seen, therefore, that there can be no movement of $a$ which is not imparted to the shaft $h$, by reason of there being no play or back-lash between the teeth of $a$ and the teeth of $j$ and $k$.

To keep the ratchet $i$ from turning, there is applied to it the pawl $n$, which, when the gauge-bar $f$ is to be returned or brought back from the saw, is thrown out of gear with the ratchet-teeth of $i$.

I claim, for the purpose specified, in the construction and arrangement of a pair of meshing-gears, dividing one gear in a plane square to its axis, and fixing one part on its shaft, while the other part is attached to said shaft by a spring, which operates to turn said part or its shaft with reference to each other.

In testimony whereof, I have hereto set my signature, this twenty-third day of October, A. D. 1867.

A. M. BEARD.

Witnesses:
 FRANCIS GOULD,
 M. W. FROTHINGHAM.